United States Patent
Kim

(10) Patent No.: US 10,578,058 B2
(45) Date of Patent: Mar. 3, 2020

(54) ENGINE SYSTEM AND METHOD OF CONTROLLING ENGINE SYSTEM TO PREVENT CONDENSATION

(71) Applicant: HYUNDAI MOTOR COMPANY, Seoul (KR)

(72) Inventor: MinSu Kim, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 576 days.

(21) Appl. No.: 15/369,378

(22) Filed: Dec. 5, 2016

(65) Prior Publication Data

US 2017/0306898 A1    Oct. 26, 2017

(30) Foreign Application Priority Data

Apr. 21, 2016  (KR) ........................ 10-2016-0048901

(51) Int. Cl.
*F02M 26/33* (2016.01)
*F02M 26/24* (2016.01)
(Continued)

(52) U.S. Cl.
CPC ......... *F02M 26/33* (2016.02); *F02B 29/0443* (2013.01); *F02B 29/0493* (2013.01);
(Continued)

(58) Field of Classification Search
CPC ........ F02M 26/33; F02M 26/24; F02M 26/04; F02M 25/07; F02M 26/06; F02M 26/28;
(Continued)

(56) References Cited

U.S. PATENT DOCUMENTS 6,978,772 B1 * 12/2005 Dorn ................. F02M 21/0215
                                                              123/568.12
8,020,538 B2 * 9/2011 Surnilla ................. F02M 26/47
                                                              123/568.12
(Continued)

FOREIGN PATENT DOCUMENTS

EP          2 375 035 A1   10/2011
JP          2011-214544 A  10/2011
(Continued)

*Primary Examiner* — Jesse S Bogue
*Assistant Examiner* — Edward Bushard
(74) *Attorney, Agent, or Firm* — Morgan, Lewis & Bockius LLP

(57) ABSTRACT

An engine system includes an engine, an intake line, an exhaust line, a turbocharger, an intercooler, a high-pressure Exhaust Gas Recirculation (EGR) system, a low-pressure EGR system, a radiator which cools a coolant, a low-pressure EGR cooling line, an intercooler cooling line, a low-pressure EGR cooling valve, an intercooler cooling valve, an electric water pump, a driving information detector detecting driving information of a vehicle including an outside air temperature, a temperature of the intake gas supplied to the engine, and a coolant temperature. The engine system further includes a controller controlling the low-pressure EGR cooling valve, the intercooler cooling valve, the high-pressure EGR valve, and the electric water pump based on the driving information. With such an engine system, it is possible to prevent condensate water from being produced due to low-temperature outside air and EGR gas recirculated by the EGR systems.

3 Claims, 3 Drawing Sheets

(51) Int. Cl.

| | | |
|---|---|---|
| *F02B 29/04* | (2006.01) | |
| *F02M 26/06* | (2016.01) | |
| *F02D 41/00* | (2006.01) | |
| *F02M 26/28* | (2016.01) | |
| *F02M 26/05* | (2016.01) | |
| *F02M 26/04* | (2016.01) | |
| *F02B 37/00* | (2006.01) | |
| *F02D 21/08* | (2006.01) | |
| *F02D 23/00* | (2006.01) | |
| *F02M 31/20* | (2006.01) | |
| *F01P 5/10* | (2006.01) | |

(52) U.S. Cl.
CPC .............. *F02B 37/00* (2013.01); *F02D 21/08* (2013.01); *F02D 23/00* (2013.01); *F02D 41/005* (2013.01); *F02D 41/0065* (2013.01); *F02M 26/04* (2016.02); *F02M 26/05* (2016.02); *F02M 26/06* (2016.02); *F02M 26/24* (2016.02); *F02M 26/28* (2016.02); *F02M 31/205* (2013.01); *F01P 5/10* (2013.01); *F01P 2060/02* (2013.01); *F02D 41/0007* (2013.01); *F02D 2200/021* (2013.01); *F02D 2200/0414* (2013.01); *Y02T 10/126* (2013.01); *Y02T 10/144* (2013.01); *Y02T 10/146* (2013.01); *Y02T 10/47* (2013.01)

(58) Field of Classification Search
CPC .. F02M 26/05; F02M 31/205; F02B 29/0443; F02B 29/0493; F02B 37/00; F02D 23/00; F02D 2200/021; F02D 2200/0414; F02D 41/0007; F02D 41/0065; F02D 41/005; F02D 21/08; Y02T 10/146; Y02T 10/47; Y02T 10/144; Y02T 10/126; F01P 5/10; F01P 2060/02; F01N 5/02

USPC .................................................. 60/618, 320
See application file for complete search history.

(56) References Cited

U.S. PATENT DOCUMENTS

| | | | | |
|---|---|---|---|---|
| 8,240,294 | B2* | 8/2012 | Surnilla | F02M 26/47 |
| | | | | 123/568.12 |
| 8,869,757 | B2 | 10/2014 | Kim et al. | |
| 9,957,878 | B2* | 5/2018 | Takahashi | F01P 7/167 |
| 10,018,097 | B2* | 7/2018 | Styles | F02M 26/30 |
| 10,119,484 | B2* | 11/2018 | Park | F02M 26/06 |
| 10,125,704 | B2* | 11/2018 | Choi | F02M 26/04 |
| 10,145,321 | B2* | 12/2018 | Choi | F02M 26/04 |
| 2011/0225955 | A1* | 9/2011 | Kimura | F01N 3/101 |
| | | | | 60/278 |
| 2015/0240730 | A1* | 8/2015 | Styles | F02D 41/144 |
| | | | | 123/393 |
| 2016/0069300 | A1* | 3/2016 | Minamoto | F02D 41/0065 |
| | | | | 123/568.11 |
| 2016/0090944 | A1* | 3/2016 | Takahashi | F01P 3/20 |
| | | | | 60/605.2 |
| 2016/0319779 | A1* | 11/2016 | LaPointe | F02B 29/0443 |
| 2017/0306898 | A1* | 10/2017 | Kim | F02M 26/04 |
| 2018/0100471 | A1* | 4/2018 | Minami | F01P 7/16 |

FOREIGN PATENT DOCUMENTS

| | | |
|---|---|---|
| JP | 2012-122478 A | 6/2012 |
| JP | 2013-181394 A | 9/2013 |
| JP | 2014-148957 A | 8/2014 |
| KR | 1998-0053770 U | 10/1998 |

\* cited by examiner

ENGINE SYSTEM AND METHOD OF CONTROLLING ENGINE SYSTEM TO PREVENT CONDENSATION

CROSS-REFERENCE TO RELATED APPLICATION

This application claims the benefit of priority to Korean Patent Application No. 10-2016-0048901, filed in the Korean Intellectual Property Office on Apr. 21, 2016, the entire contents of which are incorporated herein by reference.

TECHNICAL FIELD

The present disclosure relates to an engine system and a method of controlling an engine using the engine system, and more particularly, to an engine system and a method of controlling an engine using the same which prevents condensate water from being produced due to low-temperature outside air and Exhaust Gas Recirculation (EGR) gas recirculated by an EGR system.

BACKGROUND

An engine for an automobile generates power by mixing fuel with air introduced from the outside at an appropriate ratio and combusting the mixture.

In order to obtain a desired output and combustion efficiency, it is necessary to supply a sufficient amount of outside air for combustion during a process of generating power by the engine. To this end, a turbocharger is used as an apparatus that supercharges, or pressurizes, the engine with air for combustion in order to improve a combustion efficiency of the engine.

In general, the turbocharger is an apparatus that increases output of the engine by rotating a turbine using a pressure of exhaust gas discharged from the engine and then supplying high-pressure air into a combustion chamber by using a rotational force of the turbine. A turbocharger is applied to many diesel engines, and recently, a turbocharger is also applied to some gasoline engines.

In addition, nitrogen oxide (NOx) included in exhaust gas is considered as a main air pollutant, and research is being conducted to reduce emissions of NOx.

An exhaust gas recirculation (EGR) system is a system mounted in a vehicle in order to reduce various elements in exhaust gas. In general, NOx increases in a case in which a proportion of air in the gaseous mixture is large and thus combustion is smoothly carried out. Therefore, the exhaust gas recirculation system is a system that mixes a part (e.g., 5 to 20%) of exhaust gas discharged from the engine with the gaseous mixture again so as to reduce the amount of oxygen in the gaseous mixture and hinder the combustion, thereby inhibiting the generation of NOx.

As a representative exhaust gas recirculation system, there exists a low-pressure EGR system. The low-pressure EGR system recirculates exhaust gas, which has passed through the turbine of the turbocharger, into an intake passageway at a front end of a compressor.

However, the exhaust gas recirculated by the exhaust gas recirculation system generally has very high temperature and humidity. Therefore, condensate water is produced when the high-temperature recirculating exhaust gas and low-temperature fresh air introduced from the outside are mixed. In this case, the produced condensate water has very high acidity due to various types of substances included in the exhaust gas.

There is a problem in that the condensate water collides with a compressor wheel rotating at a high speed, which causes damage to the compressor wheel. In the related art, in order to prevent the compressor wheel from being damaged, the compressor wheel is coated to prevent damage and corrosion, but there is a problem in that manufacturing costs of the vehicle are increased due to expenses incurred when coating the compressor wheel.

In addition, there are problems in that components, which are disposed at the periphery of the portions where the exhaust gas flows, are corroded due to the condensate water having high acidity, and combustion becomes unstable as the condensate water flows into the combustion chamber of the engine.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide an engine system and a method of controlling an engine using the same, which prevents condensate water from being produced due to low-temperature outside air and EGR gas recirculated by an EGR system.

An exemplary embodiment of the present disclosure provides an engine system including: an engine which includes a plurality of combustion chambers that generates driving power by combusting fuel; an intake line into which intake gas to be supplied into the combustion chamber flows; an exhaust line through which exhaust gas discharged from the combustion chamber flows; a turbocharger which includes a turbine that is provided in the exhaust line and rotated by exhaust gas discharged from the combustion chamber, and a compressor that is provided in the intake line and rotated in conjunction with the rotation of the turbine and compresses outside air; a water-cooled intercooler which cools the intake gas introduced through the intake line through a heat exchange with a coolant; a high-pressure EGR system which includes a high-pressure EGR line that branches off from the exhaust line between the turbocharger and the engine and merges into the intake line, a high-pressure EGR cooler that is disposed in the high-pressure EGR line and cools the exhaust gas flowing through the high-pressure EGR line, and a high-pressure EGR valve that adjusts the amount of exhaust gas flowing into the high-pressure EGR line; a low-pressure EGR system which includes a low-pressure EGR line that branches off from the exhaust line at a rear end of the turbocharger and merges into the intake line, and a low-pressure EGR cooler that is disposed in the low-pressure EGR line and cools the exhaust gas flowing through the low-pressure EGR line; a radiator which cools the coolant, which is heated while cooling the engine, through a heat exchange with air introduced from the outside; a low-pressure EGR cooling line which runs through the radiator and the low-pressure EGR cooler; an intercooler cooling line which runs through the radiator and the water-cooled intercooler; a low-pressure EGR cooling valve which adjusts the mount of coolant to be supplied to the low-pressure EGR cooler; an intercooler cooling valve which adjusts the amount of coolant to be supplied to the water-cooled intercooler; an electric water pump which pumps the coolant flowing through the cooling line; a driving information detector which detects driving information of a vehicle including an outside air temperature, a temperature of the intake gas supplied to the engine, and a coolant temperature; and a controller which controls the low-pressure EGR cooling valve, the intercooler cooling valve, the high-pressure EGR valve, and the electric water pump based on the driving information detected by the driving information detector.

When the outside air temperature is lower than the condensate water production temperature, the controller may operate the electric water pump, open the low-pressure EGR cooling valve, and close the high-pressure EGR valve.

When the coolant temperature is higher than the target coolant temperature and the intake gas temperature is higher than the target intake gas temperature, the controller may operate the electric water pump, and open the intercooler cooling valve.

The low-pressure EGR line, in which the low-pressure EGR cooler is disposed, and the exhaust line, which is connected with the low-pressure EGR line, may be disposed in the gravitational direction.

Another exemplary embodiment of the present disclosure provides a method of controlling an engine, the method including: detecting, by a driving information detector, driving information of a vehicle including an outside air temperature, a temperature of the intake gas supplied to the engine, and a coolant temperature; and controlling, by a controller, based on the driving information, an operation of opening and closing a low-pressure EGR cooling valve that adjusts the amount of coolant to be supplied to a low-pressure EGR cooler, an operation of opening and closing an intercooler cooling valve that adjusts the amount of coolant supplied to a water-cooled intercooler, an operation of opening and closing a high-pressure EGR valve that adjusts the amount of exhaust gas to be supplied to a high-pressure EGR line, and an operation of an electric water pump that pumps a coolant flowing through an intercooler cooling line which runs through a radiator and the water-cooled intercooler and a low-pressure EGR cooling line which runs through the radiator and the low-pressure EGR cooler.

The controlling may include: determining whether the outside air temperature is lower than a condensate water production temperature; and determining whether the coolant temperature is higher than a target coolant temperature and the intake gas temperature is higher than a target intake gas temperature.

When the outside air temperature is lower than the condensate water production temperature, the coolant temperature is higher than the target coolant temperature, and the intake gas temperature is higher than the target intake gas temperature, the electric water pump may be operated, the low-pressure EGR cooling valve may be opened, the intercooler cooling valve may be opened, and the high-pressure EGR valve may be closed.

When the outside air temperature is lower than the condensate water production temperature, and the coolant temperature is lower than the target coolant temperature or the intake gas temperature is lower than the target intake gas temperature, the electric water pump may be operated, the low-pressure EGR cooling valve may be opened, the intercooler cooling valve may be closed, and the high-pressure EGR valve may be closed.

When the outside air temperature is higher than the condensate water production temperature, the coolant temperature is higher than the target coolant temperature, and the intake gas temperature is higher than the target intake gas temperature, the electric water pump may be stopped, the low-pressure EGR cooling valve may be closed, the intercooler cooling valve may be opened, and the high-pressure EGR valve may be opened.

When the outside air temperature is higher than the condensate water production temperature, and the coolant temperature is lower than the target coolant temperature or the intake gas temperature is lower than the target intake gas temperature, the electric water pump may be operated, the low-pressure EGR cooling valve may be closed, the intercooler cooling valve may be closed, and the high-pressure EGR valve may be opened.

According to the engine system according to the exemplary embodiment of the present disclosure, the low-pressure EGR cooling valve, the intercooler cooling valve, the high-pressure EGR valve, and the electric water pump are controlled based on the outside air temperature, the intake gas temperature, and the coolant temperature, and as a result, it is possible to prevent condensate water from being produced due to the recirculating exhaust gas and the outside air.

In addition, the low-pressure EGR line, in which the low-pressure EGR cooler is disposed, and the exhaust line, which is connected with the low-pressure EGR line, are disposed in the gravitational direction, such that the condensate water, which is produced due to EGR gas recirculated by the low-pressure EGR system and fresh air, may be discharged to the outside through the low-pressure EGR line and the exhaust line.

BRIEF DESCRIPTION OF THE DRAWINGS

The drawings are intended to be used as references for describing the exemplary embodiments of the present disclosure, and the accompanying drawings should not be construed as limiting the technical spirit of the present disclosure.

DETAILED DESCRIPTION

Figure 1:
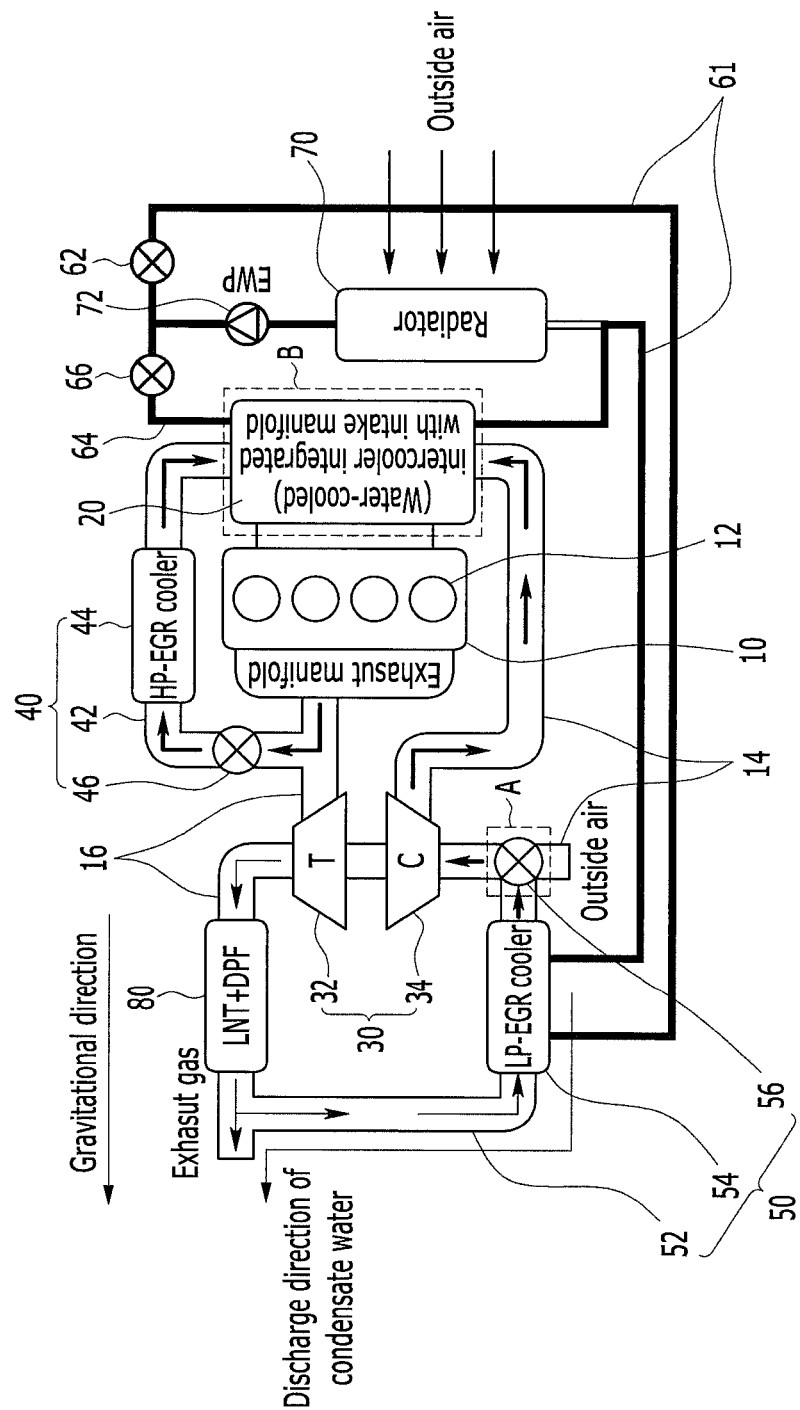
FIG. 1 is a schematic view illustrating a configuration of an engine system according to exemplary embodiments of the present disclosure.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

A part irrelevant to the description will be omitted to clearly describe the present disclosure, and the same or similar constituent elements will be designated by the same reference numerals throughout the specification.

In addition, the size and thickness of each component illustrated in the drawings may be arbitrarily shown for understanding and ease of description, but the present disclosure is not limited thereto. Thicknesses of several portions and regions are enlarged for clear disclosures.

Hereinafter, an engine system according to exemplary embodiments of the present disclosure will be described in detail with reference to the accompanying drawings.

Figure 2:
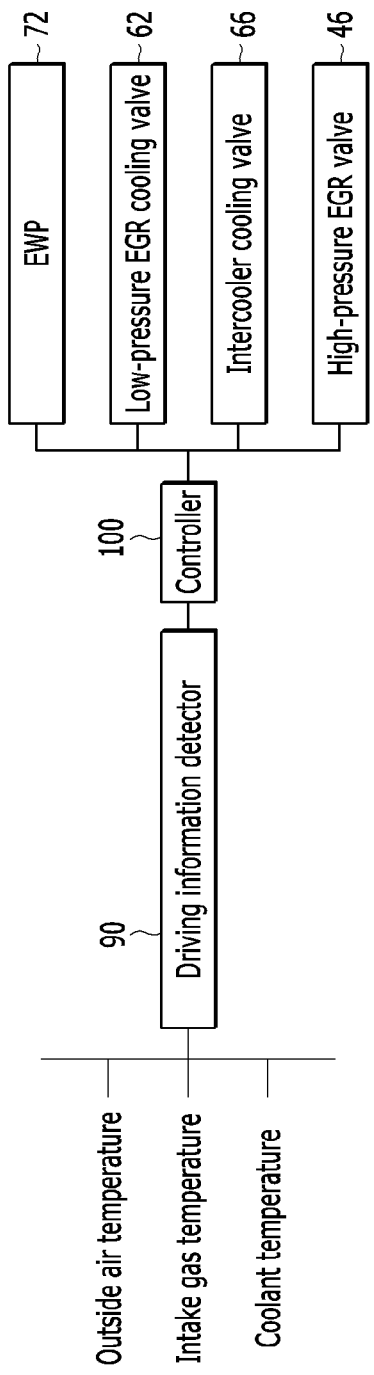
FIG. 2 is a block diagram illustrating a configuration of an engine system according to exemplary embodiments of the present disclosure.

FIG. 1 is a schematic view illustrating a configuration of an engine system according to exemplary embodiments of the present disclosure. FIG. 2 is a block diagram illustrating a configuration of an engine system according to exemplary embodiments of the present disclosure.

As illustrated in FIGS. 1 and 2, an engine system according to exemplary embodiments of the present disclosure includes an engine 10, a turbocharger 30, a water-cooled intercooler 20, a high-pressure EGR system 40, a low-pressure EGR system 50, a water-cooled intercooler 20, a cooling line, a radiator 70, an electric water pump 72, a driving information detector 90 and a controller 100. In some exemplary embodiments of the present disclosure, the driving information detector 90 is implemented with hardware, for example with one or more processors and/or sensors.

The engine 10 includes a plurality of combustion chambers 12 that generate driving power by combusting fuel. The engine 10 is provided with an intake line 14 through which intake gas to be supplied to the combustion chamber 12 flows, and an exhaust line 16 through which exhaust gas discharged from the combustion chamber 12 flows.

An exhaust gas purification apparatus 80, which removes various types of hazardous substances included in the exhaust gas discharged from the combustion chamber 12, is provided in the exhaust line 16. To remove nitrogen oxide, the exhaust gas purification apparatus 80 may include a lean NOx trap (LNT), a diesel oxidation catalyst and a diesel particulate filter.

The turbocharger 30 compresses intake gas (outside air+ recirculation gas), which flows through the intake line 14, and supplies the intake gas to the combustion chamber 12. The turbocharger 30 includes a turbine 32 which is provided in the exhaust line 16 and rotates by pressure of exhaust gas discharged from the combustion chamber 12, and a compressor 34 which rotates in conjunction with the rotation of the turbine 32 and compresses intake gas.

The high-pressure EGR (HP-EGR) system 40 includes a high-pressure EGR line 42, a high-pressure EGR cooler 44 and a high-pressure EGR valve 46.

The high-pressure EGR line 42 branches off from the exhaust line 16 between the turbocharger 30 and the engine 10, and merges into the intake line 14. The high-pressure EGR cooler 44 is disposed in the high-pressure EGR line 42, and cools the exhaust gas that flows through the high-pressure EGR line 42. The high-pressure EGR valve 46 is disposed at a point at which the exhaust line 16 and the high-pressure EGR line 42 merge together, and adjusts the amount of exhaust gas that flows into the high-pressure EGR line 42.

The low-pressure EGR (LP-EGR) system 50 includes a low-pressure EGR line 52, a low-pressure EGR cooler 54, and a low-pressure EGR valve 56.

The low-pressure EGR line 52 branches off from the exhaust line 16 at a rear end of the turbocharger 30, and merges into the intake line 14. The low-pressure EGR cooler 54 is disposed in the low-pressure EGR line 52, and cools the exhaust gas that flows through the low-pressure EGR line 52. The low-pressure EGR valve 56 is disposed at a point at which the low-pressure EGR line 52 and the intake line 14 merge together, and adjusts the amount of exhaust gas that flows into the intake line 14.

The water-cooled intercooler 20 cools intake gas, which inflows through the intake line 14 through a heat exchange with a coolant. The water-cooled intercooler 20 may be implemented in various forms, but in exemplary embodiments of the present disclosure, a water-cooled intercooler 20 integrated with an intake manifold, which is formed integrally with the intake manifold, will be described as an example of the water-cooled intercooler 20.

The radiator 70 cools the coolant, which is heated while cooling the engine 10, through a heat exchange with air introduced from the outside. The radiator 70 is disposed along the cooling line.

The cooling line includes a low-pressure EGR cooling line 61 which runs through the radiator 70 and the low-pressure EGR cooler 54, and an intercooler cooling line 64 which runs through the radiator 70 and the water-cooled intercooler 20.

The low-pressure EGR cooling line 61 and the intercooler cooling line 64 partially overlap each other, and the radiator 70 and the electric water pump are disposed at portions where the low-pressure EGR cooling line 61 and the intercooler cooling line 64 overlap each other. The electric water pump (EWP) is operated by a motor, and pumps the coolant that flows through the cooling line.

The driving information detector 90 detects driving information of a vehicle, and the detected driving information is transmitted to the controller 100. The driving information includes a temperature of outside air which flows into the intake line 14 or cools the radiator 70, a temperature of intake gas which is supplied to the engine 10 and a temperature of the coolant.

Based on the driving information detected by the driving information detector 90, the controller 100 controls the low-pressure EGR cooling valve 62, the intercooler cooling valve 66, the high-pressure EGR valve and the electric water pump.

The controller 100 may be configured, or controlled, by one or more processors which are operated by a preset program, and the preset program is configured to perform respective steps of an engine control method according to exemplary embodiments of the present disclosure.

When the outside air temperature is lower than a condensate water production temperature, the controller 100 operates the electric water pump, opens the low-pressure EGR cooling valve 62 and closes the high-pressure EGR valve 46.

The condensate water production temperature means, in some embodiments, a temperature at which the condensate water may be produced when the EGR gas recirculated by the high-pressure EGR system 40 and the outside air introduced through the intake line 14 are mixed. Otherwise, the condensate water production temperature means a temperature at which the condensate water may be produced when the EGR gas recirculated by the low-pressure EGR system 50 and the outside air introduced through the intake line 14 are mixed. The condensate water production temperature is a preset temperature which may be saved in the controller 100.

When the outside air temperature is lower than the condensate water production temperature, the condensate water is likely to be produced at a point (see part 'A' indicated in FIG. 1) where the low-pressure EGR line 52 and the intake line 14 merge together or at a point (see part 'B' indicated in FIG. 1) at which the high-pressure EGR line 42 and the intake line 14 merge together.

Therefore, in this case, because it is necessary to remove moisture included in the high-temperature and high-humidity EGR gas, the controller 100 operates the electric water pump and opens the low-pressure EGR cooling valve 62 so as to allow the coolant to flow into the low-pressure EGR cooling line 61, thereby cooling the low-pressure EGR cooler 54.

In this case, the low-pressure EGR line 52, in which the low-pressure EGR cooler 54 is disposed, and the exhaust line 16, which is connected with the low-pressure EGR line 52, may be disposed in a gravitational direction, or in a vertically ascending arrangement. Therefore, the condensate water produced in the low-pressure EGR cooler 54 is discharged to the outside along the low-pressure EGR line 52 and the exhaust line 16.

In addition, the controller 100 operates the electric water pump, and closes the high-pressure EGR valve 46, thereby preventing the exhaust gas from flowing into the high-pressure EGR line 42. As described above, by preventing the exhaust gas from flowing into the high-pressure EGR line 42, it is possible to prevent the condensate water from being produced, or formed, at the point at which the high-pressure EGR line 42 and the intake line 14 merge together.

When the coolant temperature is higher than a target coolant temperature and the intake gas temperature is higher than a target intake gas temperature, the controller 100 operates the electric water pump, and opens the intercooler cooling valve 66.

The state in which the intake gas temperature is higher than the target intake gas temperature means that the engine 10 is overheated, and the state in which the coolant temperature is higher than the target coolant temperature means that the engine 10 is adequately warmed up.

Therefore, the controller 100 operates the electric water pump, and opens the intercooler cooling valve 66 so as to allow the coolant to flow into the intercooler cooling line 64, thereby cooling the intake gas introduced through the intake line 14 and cooling the engine 10.

Hereinafter, an engine control method according to exemplary embodiments of the present disclosure will be described in detail with reference to the accompanying drawing.

Figure 3:
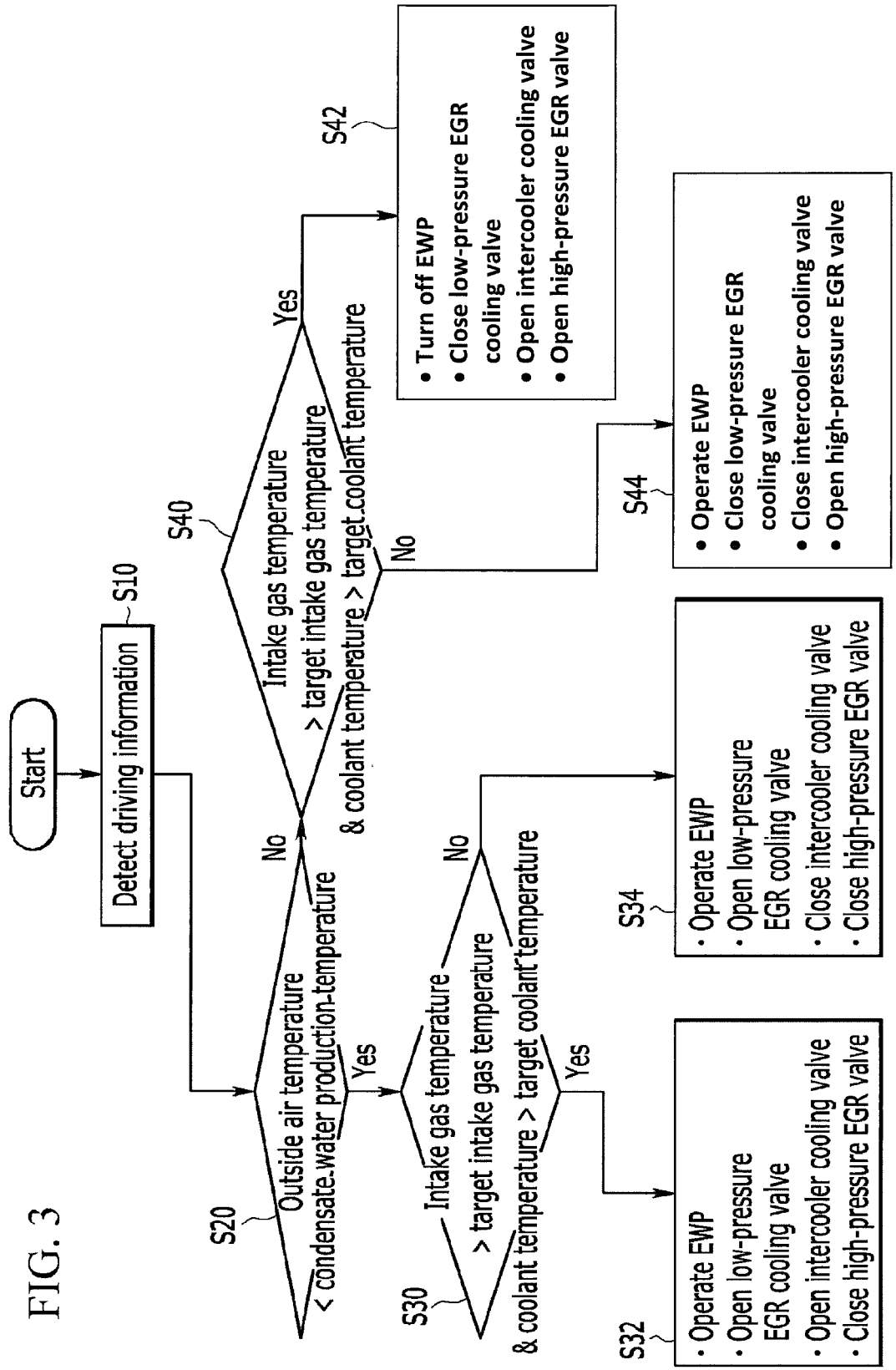
FIG. 3 is a flowchart illustrating a control method of an engine system according to exemplary embodiments of the present disclosure.

FIG. 3 is a flowchart illustrating a control method of an engine system according to exemplary embodiments of the present disclosure.

As illustrated in FIG. 3, the driving information detector 90 detects driving information of the vehicle (S10). The driving information detected by the driving information detector 90 is transmitted to the controller 100. As described above, the driving information includes an outside air temperature, a temperature of intake gas to be supplied into the engine 10 and a coolant temperature.

The controller 100 compares the outside air temperature and the condensate water production temperature, and determines whether the outside air temperature is lower than the condensate water production temperature (S20).

If the outside air temperature is lower than the condensate water production temperature, the controller 100 compares the intake gas temperature and the target intake gas temperature, and determines whether the intake gas temperature is higher than the target intake gas temperature. In addition, the controller 100 compares the coolant temperature and the target coolant temperature, and determines whether the coolant temperature is higher than the target coolant temperature (S30).

When the intake gas temperature is higher than the target intake gas temperature and the coolant temperature is higher than the target coolant temperature, the controller 100 operates the electric water pump, opens the low-pressure EGR cooling valve 62, opens the intercooler cooling valve 66 and closes the high-pressure EGR valve 46 (S32).

As the controller 100 opens the low-pressure EGR cooling valve 62, the coolant flows through the low-pressure EGR cooling line 61. Therefore, the low-pressure EGR cooler 54 provided in the low-pressure EGR cooling line 61 is overcooled, and moisture included in high-temperature and high-humidity exhaust gas flowing through the low-pressure EGR line 52 is condensed, such that condensate water is produced. In this case, the produced condensate water is discharged to the outside through the low-pressure EGR line 52 and the exhaust line 16, which are disposed in the gravitational direction, or in a vertically descending arrangement.

Further, since the high-pressure EGR valve 46 is closed, the condensate water is prevented from being produced due to the high-temperature and high-humidity exhaust gas introduced through the high-pressure EGR line 42 and cold outside air introduced through the intake line 14.

In addition, as the intercooler cooling valve 66 is opened, the coolant flows into the intercooler cooling line 64. Therefore, the overheated coolant is cooled by the radiator 70, and as a result, it is possible to decrease a temperature of the intake gas to be supplied to the combustion chamber 12.

In step S30, when the coolant temperature is lower than the target coolant temperature or the intake gas temperature is lower than the target intake gas temperature, the controller 100 operates the electric water pump, opens the low-pressure EGR cooling valve 62, closes the intercooler cooling valve 66, and closes the high-pressure EGR valve 46 (S34).

As the low-pressure EGR cooling valve 62 is opened, the coolant flows through the low-pressure EGR cooling line 61. Therefore, the low-pressure EGR cooler 54 provided in the low-pressure EGR cooling line 61 is overcooled, and moisture included in high-temperature and high-humidity exhaust gas flowing through the low-pressure EGR line 52 is condensed, such that condensate water is produced. In this case, the produced condensate water is discharged to the outside through the low-pressure EGR line 52 and the exhaust line 16 which are disposed in the gravitational direction, or in a vertically descending arrangement.

Further, since the high-pressure EGR valve 46 is closed, the condensate water is prevented from being produced due to the high-temperature and high-humidity exhaust gas introduced through the high-pressure EGR line 42 and cold outside air introduced through the intake line 14.

In addition, when the coolant temperature is lower than the target coolant temperature or the intake gas temperature is lower than the target intake gas temperature, it is not necessary to cool the water-cooled intercooler 20. As a result, the intercooler cooling valve 66 is closed to prevent the coolant from flowing into the intercooler cooling line 64.

In step S20, when the outside air temperature is higher than the condensate water production temperature, the controller 100 compares the intake gas temperature and the target intake gas temperature, and determines whether the intake gas temperature is higher than the target intake gas temperature. In addition, the controller 100 compares the coolant temperature and the target coolant temperature and determines whether the coolant temperature is higher than the target coolant temperature (S40).

When the intake gas temperature is higher than the target intake gas temperature and the coolant temperature is higher than the target coolant temperature, the controller 100 stops the operation of the electric water pump, closes the low-pressure EGR cooling valve 62, opens the intercooler cooling valve 66 and opens the high-pressure EGR valve 46 (S42).

In this case, because the likelihood of the occurrence of condensate water is very low, the controller 100 closes the low-pressure EGR cooling valve 62, thereby preventing the coolant from flowing into the low-pressure EGR cooling line 61.

Further, the high-pressure EGR valve 46 is opened, such that the exhaust gas is recirculated to the combustion chamber 12 through the high-pressure EGR line 42, and the occurrence of nitrogen oxide is inhibited by the EGR gas.

In addition, in this case, because the engine 10 is in an overheated state, and the engine 10 is in a state of being adequately warmed up, the intercooler cooling valve 66 is opened to allow the coolant to flow into the intercooler cooling line 64. Therefore, the overheated coolant is cooled by the radiator 70, and as a result, it is possible to decrease a temperature of the intake gas to be supplied to the combustion chamber 12.

In step S40, when the coolant temperature is lower than the target coolant temperature or the intake gas temperature is lower than the target intake gas temperature, the controller 100 operates the electric water pump, closes the low-pressure EGR cooling valve 62, closes the intercooler cooling valve 66 and opens the high-pressure EGR valve 46 (S44).

In this case, because the likelihood of the occurrence of condensate water is very low, the controller 100 closes the low-pressure EGR cooling valve 62, thereby preventing the coolant from flowing into the low-pressure EGR cooling line 61.

Further, the high-pressure EGR valve 46 is opened, such that the exhaust gas is recirculated to the combustion chamber 12 through the high-pressure EGR line 42 and the occurrence of nitrogen oxide is inhibited by the EGR gas.

In addition, when the coolant temperature is lower than the target coolant temperature or the intake gas temperature is lower than the target intake gas temperature, it is not necessary to cool the water-cooled intercooler 20. As a result, the intercooler cooling valve 66 is closed to prevent the coolant from flowing into the intercooler cooling line 64.

While this disclosure has been described in connection with what is presently considered to be exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. An engine system comprising:
an engine including a plurality of combustion chambers that generate driving power by combusting fuel;
an intake line into which intake gas to be supplied into the combustion chamber flows;
an exhaust line through which exhaust gas discharged from the combustion chamber flows;
a turbocharger including a turbine provided in the exhaust line and rotated by exhaust gas discharged from the combustion chamber, and a compressor provided in the intake line and rotated in conjunction with the rotation of the turbine and compresses outside air;
an intercooler which cools the intake gas introduced through the intake line through a heat exchange with a coolant;
a high-pressure Exhaust Gas Recirculation (EGR) system which includes a high-pressure EGR line that branches off from the exhaust line between the turbocharger and the engine and merges into the intake line, a high-pressure EGR cooler disposed in the high-pressure EGR line and that cools the exhaust gas flowing through the high-pressure EGR line, and a high-pressure EGR valve that adjusts an amount of exhaust gas flowing into the high-pressure EGR line;
a low-pressure EGR system which includes a low-pressure EGR line that branches off from the exhaust line at a rear end of the turbocharger and merges into the intake line, and a low-pressure EGR cooler disposed in the low-pressure EGR line and that cools the exhaust gas flowing through the low-pressure EGR line;
a radiator which cools the coolant, which is heated while cooling the engine, through a heat exchange with air introduced from the outside;
a low-pressure EGR cooling line which runs through the radiator and the low-pressure EGR cooler;
an intercooler cooling line which runs through the radiator and the intercooler;
a low-pressure EGR cooling valve which adjusts the amount of coolant to be supplied to the low-pressure EGR cooler;
an intercooler cooling valve which adjusts the amount of coolant to be supplied to the intercooler;
an electric water pump which pumps the coolant flowing through the low-pressure EGR cooling line and the intercooler cooling line;
a driving information detector which detects driving information of a vehicle including an outside air temperature, a temperature of the intake gas supplied to the engine and a coolant temperature; and
a controller programmed to control the low-pressure EGR cooling valve, the intercooler cooling valve, the high-pressure EGR valve and the electric water pump based on the driving information detected by the driving information detector,
wherein, when the outside air temperature is lower than a condensate water production temperature, the coolant temperature is higher than a target coolant temperature and an intake gas temperature is higher than a target intake gas temperature, the electric water pump is operated to pump the coolant, the low-pressure EGR cooling valve is opened, the intercooler cooling valve is opened, and the high-pressure EGR valve is closed,
wherein, when the outside air temperature is lower than the condensate water production temperature and the coolant temperature is lower than the target coolant temperature or the intake gas temperature is lower than the target intake gas temperature, the electric water pump is operated to pump the coolant, the low-pressure EGR cooling valve is opened, the intercooler cooling valve is closed, and the high-pressure EGR valve is closed,
wherein, when the outside air temperature is higher than the condensate water production temperature, the coolant temperature is higher than the target coolant temperature the intake gas temperature is higher than the target intake gas temperature, the electric water pump is stopped from being operated to stop pumping the coolant, the low-pressure EGR cooling valve is closed, the intercooler cooling valve is closed, and the high-pressure EGR valve is opened, and
wherein, when the outside air temperature is higher than the condensate water production temperature and the coolant temperature is lower than the target coolant temperature or the intake gas temperature is lower than the target intake gas temperature, the electric water pump is operated to pump the coolant, the low-pressure EGR cooling valve is closed, the intercooler cooling valve is opened, and the high-pressure EGR valve is opened.

2. The engine system of claim 1, wherein:
the low-pressure EGR line, in which the low-pressure EGR cooler is disposed, and the exhaust line, which is connected with the low-pressure EGR line, are disposed in a gravitational direction, or in a vertically descending arrangement.

3. A method of controlling an engine, the method comprising steps of:
detecting, by a driving information detector, driving information of a vehicle including an outside air temperature, a temperature of an intake gas supplied to the engine and a coolant temperature; and
controlling, by a controller, based on the driving information, an operation of opening and closing a low-pressure Exhaust Gas Recirculation (EGR) cooling valve that adjusts the amount of coolant to be supplied to a low-pressure EGR cooler, an operation of opening and closing an intercooler cooling valve that adjusts an amount of coolant supplied to an intercooler, an operation of opening and closing a high-pressure EGR valve that adjusts an amount of exhaust gas to be supplied to a high-pressure EGR line, and an operation of an electric water pump that pumps a coolant flowing through an intercooler cooling line which runs through a radiator and the intercooler and a low-pressure EGR cooling line which runs through the radiator and the low-pressure EGR cooler,
wherein the step of controlling includes:
determining whether the outside air temperature is lower than a condensate water production temperature; and
determining whether the coolant temperature is higher than a target coolant temperature and whether the intake gas temperature is higher than a target intake gas temperature,
wherein, when the outside air temperature is lower than the condensate water production temperature, the coolant temperature is higher than the target coolant temperature and the intake gas temperature is higher than the target intake gas temperature, the electric water pump is operated to pump the coolant, the low-pressure EGR cooling valve is opened, the intercooler cooling valve is opened, and the high-pressure EGR valve is closed,
wherein, when the outside air temperature is lower than the condensate water production temperature and the coolant temperature is lower than the target coolant temperature or the intake gas temperature is lower than the target intake gas temperature, the electric water pump is operated to pump the coolant, the low-pressure EGR cooling valve is opened, the intercooler cooling valve is closed, and the high-pressure EGR valve is closed,
wherein, when the outside air temperature is higher than the condensate water production temperature, the coolant temperature is higher than the target coolant temperature and the intake gas temperature is higher than the target intake gas temperature, the electric water pump is stopped from being operated to stop pumping the coolant, the low-pressure EGR cooling valve is closed, the intercooler cooling valve is closed, and the high-pressure EGR valve is opened, and
wherein, when the outside air temperature is higher than the condensate water production temperature and the coolant temperature is lower than the target coolant temperature or the intake gas temperature is lower than the target intake gas temperature, the electric water pump is operated to pump the coolant, the low-pressure EGR cooling valve is closed, the intercooler cooling valve is opened, and the high-pressure EGR valve is opened.

* * * * *